United States Patent

Miles

[15] 3,643,506
[45] Feb. 22, 1972

[54] MARINE SPEEDOMETER
[72] Inventor: Frederick G. Miles, Ashurst, England
[73] Assignees: F. G. Miles Engineering Limited, Sussex; Chetwode Marine Sales Limited, London, England
[22] Filed: Dec. 29, 1969
[21] Appl. No.: 888,661

[30] Foreign Application Priority Data
Dec. 31, 1968  Great Britain.......................61,945/68

[52] U.S. Cl............................................................73/186
[51] Int. Cl.....................................................G01c 21/00
[58] Field of Search....................73/181, 183, 186, 185, 228; 324/70 CG; 235/151.32

[56] References Cited
UNITED STATES PATENTS
3,482,444   12/1969   Jefferson.................................73/186

*Primary Examiner*—Donald O. Woodiel
*Attorney*—Sughrue, Rothwell, Mion, Zinn & Macpeak

[57] ABSTRACT

A marine speedometer for use on small boats has a mounting for fitting to the hull of the boat, the mounting projecting through the hull. The mounting supports a vertical shaft the lower end of which carries a wand deflectable against a restoring force by the movement of the water past the boat to turn the wand about the shaft axis to a position dependent on the speed of the boat. The shaft is turned with the wand and is coupled to the wiper of a rheostat located in board of the boat. The rheostat is part of an electrical circuit providing a speed indication. Additionally an integrating circuit may be provided to give a log of distance covered.

9 Claims, 8 Drawing Figures

MARINE SPEEDOMETER

This invention relates to measuring the rate of flow of a fluid and is particularly, though not exclusively, concerned with providing a relatively simple marine speedometer for use on small boats.

According to the present invention there is provided a device for measuring the rate of flow of a fluid relative thereto, the device comprising an element for immersion in the fluid, said element being pivotally mounted to be deflectable by the force exerted thereon by the fluid flowing therepast; means biasing said element against deflection such that said element adopts a position dependent on the rate of flow of said fluid and an electrical transducer coupled to said element to provide an electrical characteristic which is a function of the position of said element, wherein said transducer comprises a first, fixed part and a second part movable relative to said first part to provide said electrical characteristic which is a function of the relative position of said parts, said second part being coupled to said element to be movable therewith.

In order that the invention may be better understood exemplary embodiments of the invention will now be described with reference to the accompanying drawings in which.

Figure 1:
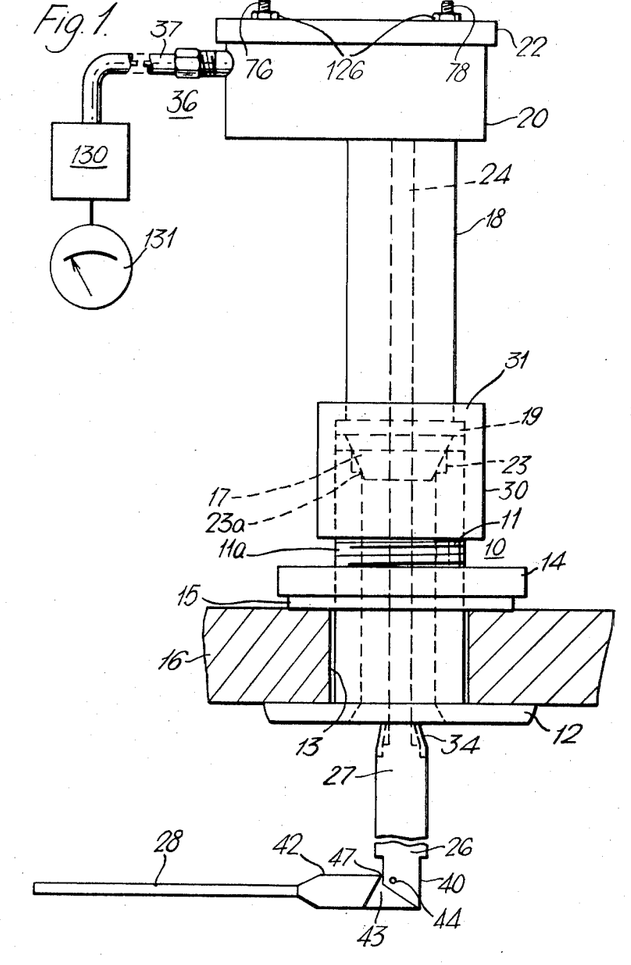
FIG. 1 shows an exterior view of a speedometer sensing mechanism according to the invention in its working position.

Referring firstly to the general arrangement shown in FIG. 1, the speedometer mechanism has a housing including a lower stem part 10 in the form of a tube 11, the lower end of which is formed with a comparatively large flange 12.

A hole 13 is made in the hull 16 of the vessel to which the speedometer mechanism is attached to allow the lower part of the tube 11 to pass and this part is then secured and made watertight by means of a clamp ring 14 and sealant or packing 15 with the flange 12 against the bottom of the hull 16. The bore of tube 11 extends through the flange as shown in chain lines. The stem part 10 thus becomes a permanent fitting to the hull and the remainder of the speedometer is detachably secured to the stem part 10.

Figure 3A:
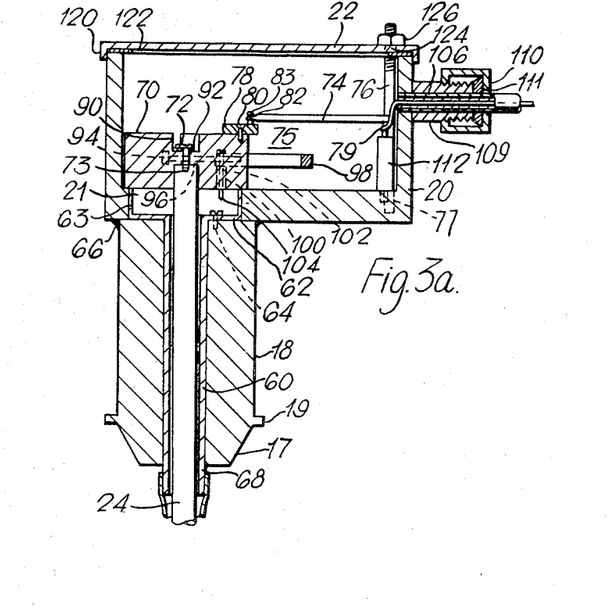
FIGS. 3a and 3b show cross-sectional views of upper and lower parts of the speedometer mechanism along the line A—A of FIG. 2.
Figure 3B:
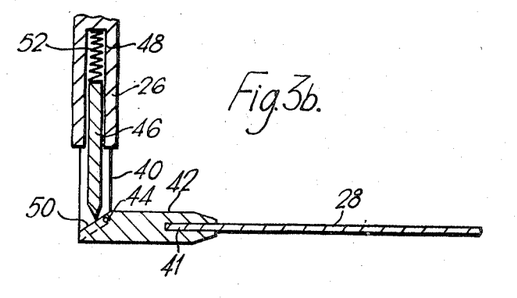

The housing further comprises an upper tubular stem portion 18 at the top of which is eccentrically mounted a cup 20 closed by a top cover 22. The cup 20 contains parts of the speedometer mechanism and an electrical transducing element described subsequently. Depending through an aperture 21 (FIG. 3) in the bottom of the cup is a shaft 24 which terminates at its lower end in a boss 26 to which a wand 28 is pivotally mounted at the lower end thereof to project horizontally at 45° leading athwartships when the boat is not moving through the water. The mounting of the wand will be described more fully hereinafter as will the arrangement of the shaft 24. The lower and upper tubular stems 11 and 18 are joined by a locknut 30 screwed on to a threaded portion 11a of the lower stem 11. The upper part of the thread is not shown for clarity although some internal detail relevant to the present description is shown in chain lines. The locknut 30 has an upper inwardly directed flange 31 which engages with an outwardly directed flange 19 (see also FIG. 3) on the upper stem 18. The upper stem 18 has a tapered lower end 17 which engages the shoulder 23a formed by an enlarged diameter bore 23 in the upper end of tube 11. On tightening the locknut 30 the two stems are rigidly secured together in watertight fashion.

It is also necessary to prevent water leaking into the cup 20 containing the transducer by travelling along the outside of shaft 24. The manner in which this is done will become more apparent from the later description referring to FIGS. 3a and 3b but includes the use of a tubular neoprene jacket 34, only the lower end of which can be seen in FIG. 1 as fitting over a reduced diameter portion 27 of the boss 26 at the lower end of shaft 24, the neoprene jacket being adhesively secured to the portion 27.

As will be more fully explained below the output from the speedometer is a signal of an electrical form or characteristic which is taken through an outlet 36 at one side of the cup 20 by means of a coaxial cable 37.

The housing parts 10, 18, 20 and 22 and outlet 36 are conveniently of machined brass. The wand 28, shaft 24 and boss 26 are preferably of stainless steel. The wand may otherwise be of nylon and may be tapered or otherwise profiled to assist in linearizing the response characteristic of the speedometer more fully discussed below.

Before turning to the construction of the speedometer mechanism in more detail, the general principle of operation is that as the wand 28, which acts as a vane, moves through the water, the force of the water on the wand will cause rotation of the shaft 24 about its longitudinal axis against the action of a spring (to be described) so that the wand and shaft adopt an angular position which is a function of the speed of the boat relative to the water. A transducer is coupled to the shaft 24 to provide an electrical characteristic which is a function of the angular position of the wand. The transducer and a circuit arrangement into which it is connected are described subsequently.

The manner in which the wand 28 is pivotally mounted to the shaft 24 will now be described with reference to FIG. 3b of the drawings. At the lower end of the boss 26 is a fork 40 having two prongs aligned perpendicularly to the plane of the drawing so that one prong can be seen in FIG. 3b. The wand 28 is inserted into an axial opening 41 at one end of a cylindrical boss 42 having at its other end a flat blade portion 43 which enters between the prongs of the fork and is pivotally mounted therebetween by a pin 44 extending therethrough. The wand 28, which is a length of rod of circular cross section, and say 2½ inches long by one-eighth of an inch in diameter (1 inch equals 2.54 centimeters), is thus able to move in a vertical plane about the pivot pin 44. In order to force the wand 28 into a horizontal position at right angles to the axis of shaft 24, a pin 46, freely movable in an axial recess 48 in the boss 26, projects out of the recess 48 between the prongs of fork 40 and is pressed down upon a camming surface 50 at the end of blade 43 by means of a helical spring 52 contained within recess 48. As will be seen from FIG. 3b the point of contact of the lower V-shaped end of pin 46 relative to the axis of pivot pin 44 is such as to turn the wand 28 clockwise as seen in FIG. 1. Movement beyond the horizontal position shown in FIG. 1 is prevented by the cylindrical portion of boss 42 coming into contact with the two prongs of fork 40 as shown at 47 in FIG. 1. The axial recess 48 in the boss 26 opens between the two prongs of the fork 40.

Turning now to FIG. 3a, this figure shows the upper portion of shaft 24 and the manner in which it is located in the upper stem 18 of the speedometer mechanism. For clarity in FIG. 3a, the lower housing portion 10 has been omitted together with the locknut 30.

In FIG. 3a the shaft 24 is shown rising through the tubular upper stem 18 with an intermediate sleeve 60 lining the hollow portion of stem 18. Some small clearance is provided between shaft 24 and sleeve 60 to allow free rotation of the shaft. This sleeve 60 has at its top a cup 62 which is integral therewith and which is seated in an aperture 63 in the cup 20 eccentrically of the axis of cup 20. The cup 62 is apertured to receive screws 64 (only one of which is shown) which engage in correspondingly threaded holes in the top surface of the stem 18. The stem is itself brazed to the lower surface of the cup 20 as indicated at 66. In this manner the sleeve 60 with its upper cup 62, the stem portion 18, and the cup 20, are all held rigidly together.

It will be recalled that when the locknut 30 is tightened in position water is prevented from leaking through the upper end of stem 11 by the tapered portion 7 of the stem 18 bearing upon the shoulder 23a and also by the engagement of the locknut 30. It is also necessary to prevent leakage up the hollow portion of stem 18 and this is done by means of the tubular neoprene jacket 34, the lower end of which (see FIG. 1) is secured on the boss 26 and which surrounds the shaft 24 as it passes through the housing portion 10. The upper end of the jacket 34 is fitted over, and adhesively secured to, the lower end 68 of the sleeve 60 projecting below the lower face of the stem 18. In this way water is prevented from passing along the outside of the shaft 24 in clearance between it and the sleeve 60. The sleeve 60 is made a close fit to the interior of stem 18 as is the lower face of cup 62 to the top face of the stem 18 so that a watertight fit is obtained here.

The mechanism contained within the cup 20 will now be described with reference to FIGS. 2 and 3a.

The center of the cup 62 is apertured to allow the shaft 24 to rise therethrough. The top of the shaft is secured to the bottom of a cutaway disc 70 by means of a screw 72 passing through an axial aperture in the disc 70 and engaging a correspondingly threaded hole 73 at the upper end of shaft 24. It will be noted that the upper surface of the wall of cup portion 62 is flush with the inner bottom surface of cup 20 and the disc 70 is arranged to have a small clearance above the bottom surface of the cup 20 so as to be able to rotate about its axis with the shaft 24 and wand 28. The rotation of the disc 70 in response to the force of water acting on wand 28 is restrained by a helical spring 74 fastened between a post 76 and the upper peripheral portion of the disc 70. The fastening of the spring 74 to the disc 70 is through an eccentric 75 mounted to allow for the change in angle of the spring relative to the peripheral point of disc 70 to which it is fastened. The eccentric 75 is in the form of a small disc 78 having an axial aperture through which is received a screw 80 engaging a correspondingly threaded hole in the top surface of disc 70. The disc 78 has an upstanding pin 82 with a restricted neck portion 83, around which one end of spring 74 is fastened. The support post 76, to which the other end of the spring is fastened at 79, is a piece of threaded rod, the lower end of which is received in a threaded aperture 77 in the base of cup 20 and the other end of which projects above the cup to provide a means of fastening the top cover for the cup, as will be later described.

The speedometer mechanism is provided with two stops allowing rotation of the wand 28 through 90°. These stops are, in part, formed by a flat portion 71 of the disc 70 resulting from the removal of a segment of the disc shown in FIG. 2, providing two stop surface portions 86 and 87 engageable with an upstanding post 88 formed of a length of threaded rod. The lower end of the post 88 is received in a correspondingly threaded hole (not shown) in the base of the cup portion 62 in a like manner to the supporting of post 76, and like post 76 the upper end of the post 88 projects above the mouth of cup 20 to provide a means for fastening the top cover over the cup 20.

Referring again to FIG. 2 it will thus be realized that if the wand 28 is moving through the water in the direction indicated by arrow M, the wand will turn clockwise turning the disc 70 therewith and extending the spring 74 to provide a restoring torque increasing with angular deflection. Thus the wand 28 will adopt an angular position at which the water and spring forces balance one another and this position is a function of speed through the water. The limiting position for the clockwise movement of the wand 28 is where the disc 70 turns through a right angle such that the stop surface 87 abuts the post 88. As already mentioned the eccentric 75 allows for the change of angle of the spring relative to the periphery of disc 70. The arrangement is such that, in the rest position shown with the top surface 86 abutting post 88, the spring 74 will be in a substantially unstressed condition to provide the minimum of force to be overcome to allow wand 28 to be turned by the flow of water therepast.

As already mentioned the indication given by the speedometer mechanism is an electrical characteristic and the means for doing this will now be described. Briefly the transducer comprises a variable resistance or rheostat having a fixed part in the form of a resistive track portion and a movable part in the form of a wiper engaged therewith. More particularly the disc 70 has a diametric, rectangular cross section, groove 90 cut in its top surface. Extending along the groove and projecting beyond the periphery of the disc 70 at one side of the groove is a piece of copper strip 92 which is fastened to the bottom surface of groove 90 by the screw 72, together with an additional screw 93. The projecting end of copper strip 92 has a downwardly depending portion 94 (see FIG. 3a) from which extends a conventional type wiper 96 which engages a rheostat track 98. The rheostat may be wire wound on any suitable insulating body. The track 98 is shaped in an arc of a circle centered on the axis of the shaft 24 and is supported at its end, above the bottom of cup 20 by bushes 100 (one of which is seen in FIG. 3a). Screws 102 enter through apertures in the ends of the insulating support of the rheostat track and the bushes 100 and engage in threaded screw holes 104 in the base of cup 20, such as is shown in FIG. 3a. Thus as the disc 70 rotates with the wand 28, the wiper 96 moves along the track 98, and thus the resistance between the wiper and the ends of the track 98 varies as a function of the deflection of the wand 28 and hence of the speed of the boat through the water. In order to make use of this variation of resistance, electrical connections are provided to the wiper 96 and to one end of the potentiometer track 98 as will now be described.

To receive the coaxial cable 37 the sidewall of cup 20 has an aperture 106 and extending from the outside of the wall coaxially with the aperture 106 is the outlet 36 for retaining the cable 37 which enters through the aperture 106. This outlet comprises a tubular portion 109, one end of which is threaded to receive a threaded cap 110 which, when screwed up on the tubular portion 109, compresses a rubber washer 111 about the cable 194 to securely retain it. The outer conductor of the coaxial cable is taken to the terminal lug of a standoff insulator 112 affixed to the base of cup 20 while the inner conductor is taken to the terminal lug of standoff insulator 114, also fixed to the base of cup 20. For example, the lower ends of the insulators 112 and 114 may be threaded and received in correspondingly threaded apertures in the base of cup 20. Connected to the outer braid of the coaxial cable 37 there is a lead 113 extending from the standoff insulator 112 to the copper strip 92 to which it is soldered at the inner end of the strip. It will be noted that there is sufficient slack in the lead to allow for rotation of the disc 70 without placing strain upon the soldered joint. A further lead 115 extends from the inner of the coaxial cable 37 terminated on standoff insulator 114 to the right-hand end of the rheostat track 98.

In order to protect the mechanism within cup 20, the mouth of the cup is closed by the cover 22. The cover 22 has a depending rim 120 giving a close fit to the outside of cup 20. The cover seats on the mouth of the cup with an intervening annular washer 122. The posts 76 and 88 are diametrically opposite one another across the cup 20 and the cover 22 and washer 122 contain a pair of similarly arranged and spaced holes 124 (only one of which is shown in FIG. 3a) through which posts 76 and 88 project to receive nuts 126 whereby the cover 22 is secured to the cup 20 as shown in FIG. 1.

When the speedometer is used, the variation of resistance may be utilized as desired in an external circuit mounted wherever is convenient, so as to provide on an appropriately calibrated electrical meter an indication of speed through the water. The external circuit and meter are diagrammatically shown in FIG. 1 as units 130 and 131 respectively. The deflection of wand 28 with speed will follow a generally cosine law if the extension of spring 74 with angular deflection is linear but the mounting of the wand 28 to have a 45° leading rest position to the athwartships line of the vessel allows the more nearly linear part of the cosine curve to be used. The profile of wand 28 will also affect the response characteristic. It has been found practical to use a rheostat track having a linear resistance law in the circuit but the law could be selected to have another form as is well known in the potentiometer art. However, in deriving any such laws for the rheostat track the rate of extension of the spring 74 with the rotation of disc 70 will have to be taken into account and also the linearity or otherwise of the response of circuit 130 to the resistance changes. The output of the speedometer circuitry could also be to an integrator circuit (shown in block form in FIG. 6) to provide from the integrator a logging signal indicating distance covered.

It will be seen from FIG. 1 that while the lower housing portion 10 is intended for permanent fixing to the hull of a boat, the remainder of the speedometer can be detached as required by unscrewing the locknut 30 from the lower stem 11 of the housing 10. The upper stem 18 together with the cup 20 is then pulled upwards, withdrawing the shaft 24 and as the wand 28 engages the bottom of the hull it can deflect to a vertical position in line with shaft 24 by compression of the spring 52 to allow the shaft and wand to be withdrawn through the tubular stem 11. Replacement is done in like manner. In order to seal the upper end of tubular stem 11 when the speedometer mechanism is withdrawn a suitable cap can be screwed on to the threaded portion 11a.

Figure 4:
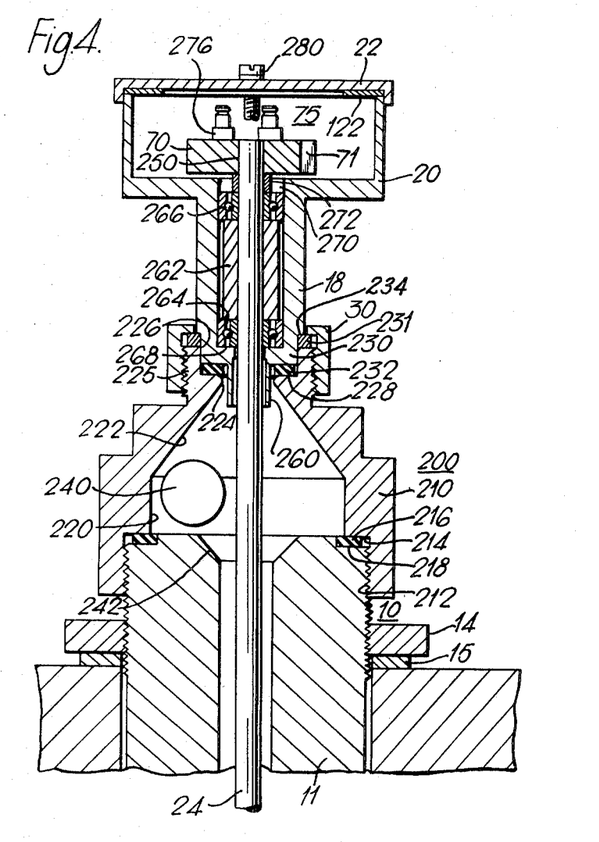
FIG. 4 shows a modified form of the speedometer mechanism and in particular includes means for preventing excessive ingress of water when inserting or removing the detachable part of the mechanism.
Figure 5:
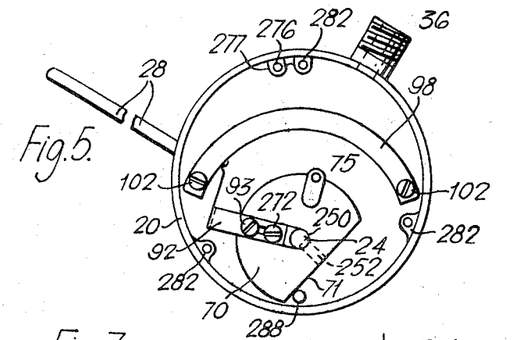
FIG. 5 shows a plan view, like that of FIG. 2, of the speedometer mechanism of FIG. 4.

A modified speedometer construction will now be described with reference to FIGS. 4 and 5. The construction shown here has a closure arrangement to prevent excessive ingress of water when placing the detachable part of the speedometer in position or withdrawing it from the housing 10. In the construction of FIGS. 4 and 5 not all parts are shown but parts like to parts of the speedometer of FIGS. 1 to 3 will be given like reference numerals and the following description will hence concentrate on the differences between this construction and the above described device.

The lower stem tube 11 of the housing 10 is surmounted by a closure arrangement 200 which in turn carries the upper tubular stem portion 18 which in this case is integrally formed with the cup 20.

The closure arrangement 200 comprises a tubular housing 210 having an internally threaded lower bore 212 engaged with the thread at the top of tube 11. This bore terminates in a shoulder 214 engaging a sealing ring 216 carried in an annular recess 218 at the upper periphery of tube 11. A second smaller diameter bore 220 extends upwardly from shoulder 214 and leads to an inwardly and upwardly tapered bore 222 of circular cross section terminating in a mouth 224 from which extends a further wider bore 226 for receiving the upper housing of the speedometer.

The stem 18 has a reduced diameter portion 230 at its lower end which enters the bore 226 and engages the shoulder 228 formed at the lower end of bore 226 through a sealing ring 232. The shoulder 234 formed at the upper end of reduced diameter portion 230 locates a metal ring 231 brazed to the stem 18 to form a flange which seats upon the top of the housing 210 and is engaged by the flange of the locknut 30. The upper portion 225 of the housing 210 is dimensioned and exteriorly threaded to receive the locknut 30 thereon. In the compartment defined by the bores 222 and 220 is received a buoyant ball 240 (of cork or a hollow plastics material for example) so that when the housing portion 18 is detached and removed with the shaft 24 and wand 28, the ball 240 is forced toward the mouth 224 by the water entering through tube 11. The mouth is thereby closed off until the aforementioned cap can be fitted to the upper end of housing 210.

On replacing the speedometer mechanism the ball 240 is easily displaced by the wand 28 to allow the latter to be moved down through tube 11 the upper end of which has a tapered opening 242 to help in guiding the wand downward.

In the modified speedometer mechanism, the shaft 24 enters a central aperture 250 extending through disc 70 and is held therein by a grub screw (not shown) engaged in a threaded hole 252 (FIG. 5) extending from the flat 71 to the aperture 250. The shaft may be provided with a locating flat engageable by the grub screw. The strip 92 stops short of aperture 250 and the screws 272 and 93 holding the strip are to one side of the aperture. The shaft 24 is not supported in a sleeve lining the bore of tubular stem 18 but is guided by a sleeve 260 FIG. 4) projecting from the lower end of stem 18 and by ball races 264 and 266 separated by a sleeve 262. Ball race 264 is positioned against an internal shoulder 268 of stem 18 while ball race 266 is held in position by a spring ring 270 in the bore of stem 18 and surrounding a spacer 272 supporting the disc 70 clear of the bottom of cup 20. The ball races are adhesively secured as by "loctite."

Figure 2:
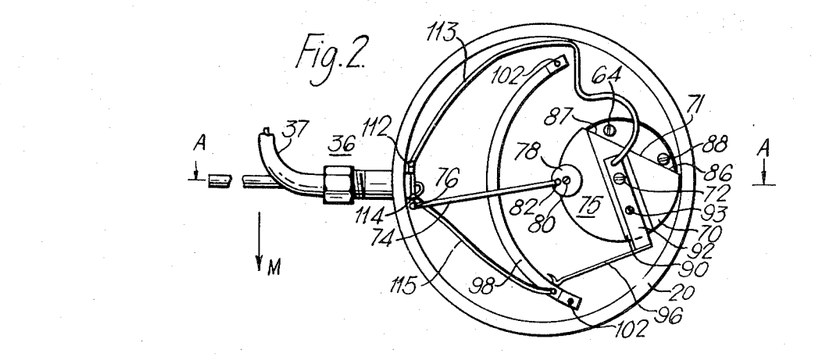
FIG. 2 shows a plan view, to an enlarged scale, of the speedometer mechanism of FIG. 1 with the top cover removed.

The restoring spring (not shown — 74 in FIG. 2) acting on disc 70 is fastened to a post 276 which unlike post 76 of FIGS. 1 to 3 does not extend upwardly through cap 22 but is located within the cup 20 on a lug 277 inwardly projecting from the wall of the cup. In the modified construction the post 88 of FIGS. 1 to 3 is likewise replaced by a post 288 located within the cup 20. The cap 22 is secured by screws such as 280 engaging in threaded apertures in lugs 282 inwardly projecting from the walls of cup 20.

Other features of the modified speedometer not shown in FIGS. 4 and 5 can be readily adapted from the construction of FIGS. 1 to 3.

Alternatively the lower end of the lower stem tube could be closed with a spring-loaded flap or have a spring-loaded ball located therealong and deflectable horizontally.

In order to ensure correct alignment of the wand 28 when operatively mounted the tubular portions 11 and 18 may be provided with a cooperating lug and slot arrangement to locate them in a predetermined angular relationship. Provided the housing portion 10 is correctly aligned initially when fixing it to the boat hull, the correct positioning of wand 28 is ensured. Alternatively the cap could have a line marked thereon for aligning a datum line marked internally on the bottom of the hull.

The two speedometer mechanisms described above are both relatively simple in construction. The wand 28 turns with and turns about the vertical shaft 24 depending from the cup 20, The shaft thus both supports the wand 28 and at the same time provides a direct mechanical coupling to the movable part (wiper 96) of the transducer in the cup 20. The wiper 96 mounted directly to the upper end of the shaft 24 thus turns about the shaft axis with the wand 28 and reproduces exactly the movement of the wand 28.

The provision of a speed-indicative signal is simple by use of a rheostat. The latter is made part of a potential divider across which a direct voltage is supplied derived from the battery supply of the boat. The voltage at wiper 96 of the rheostat thus varies as a function of the position of wand 28 and is utilized in circuit 130. There is an advantage in using direct current signals as these will not be affected by the characteristics of the cable 37.

A preferred form of indicating circuit will now be described with reference to FIG. 6 of the accompanying drawings which is a circuit diagram including the rheostat 96, 98 and meter 131 already described.

Figure 6:
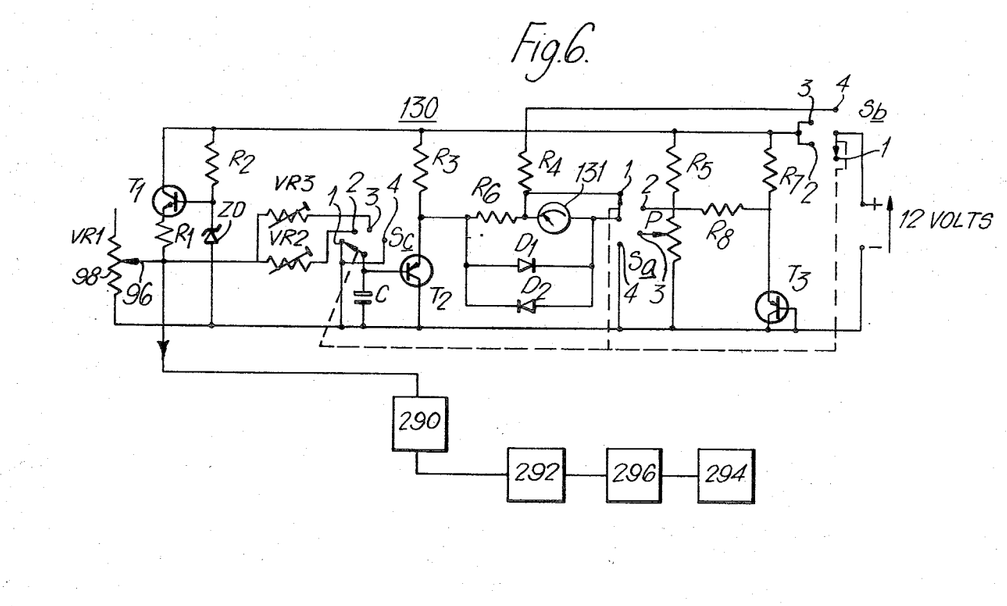
FIG. 6 shows a preferred speed indicating circuit for use with the speedometer mechanism.

In FIG. 6, the rheostat track 98 and wiper 96 of the speedometer assembly are shown as a variable resistor $VR_1$ in series with a resistor $R_1$ in the emitter circuit of an NPN transistor $T_1$ which maintains a substantially constant voltage across the series connection by virtue of the constant voltage provided at the base of transistor $T_1$ by zener diode ZD. The rheostat track 98 is selected to have a low resistance compared with that of resistor $R_1$. The voltage developed at the wiper 96 is applied to the base of a PNP transistor $T_2$ through a low pass filter circuit comprising a preset variable resistor $VR_2$ or $VR_3$ and a capacitor C. The object of the filter is to remove small fluctuations of the voltage at wiper 96 due to small excursions of the wand 28 of the speedometer from its mean deviation at a given speed and to filter out the effects of vibration etc., which would make the meter difficult to read especially when looking for small changes in speed in the TRIM position referred to below.

The circuit shown can perform three functions dependent on the position selected of a three-pole, four-way switch Sa, Sb, Sc The switch is shown in an OFF position 1 where the supply voltage is disconnected and the meter 131 shorted to protect its movement.

Switch position 2 is a SPEED position where the meter responds to the speed-dependent voltage variations at the base of transistor $T_2$. In this position $T_2$ and $T_3$ and resistors $R_3$ and $R_7$ form a bridge connected across the supply voltage with the meter 131 being connected between the emitters of the transistors through $R_6$ and $R_8$. Variations in potential at the emitter of transistor $T_2$ (in series with resistor $R_3$) due to temperature or supply voltage changes will be balanced by similar variations at the emitter of transistor $T_3$ in series with resistor $R_7$ which is given the same value as resistor $R_3$, the transistors $T_2$ and $T_3$ being of the same type.

Switch position 3 is a TRIM position in which the voltage at the emitter of transistor $T_2$ is balanced against an offset voltage at the wiper of a potentiometer P in series with resistor $R_5$ across the supply voltage; the transistor $T_3$ and resistor $R_7$ are now out of circuit. The object of the TRIM position is to provide a sensitive indication of whether the speed of the boat is increasing or decreasing as set by potentiometer P which may have a calibrated dial for this purpose. To this end it is proposed that the meter 131, as well as having an ordinary scale marked in knots for the SPEED position, has a central colored segment adjacent the main scale or superimposed thereon with a center line marked to indicate zero. The circuit is such that when the boat is moving at the speed corresponding to the voltage selected at the wiper of potentiometer P, the meter reads half scale, that is lies on the center line of the colored segment. The knob for adjusting potentiometer P is calibrated in terms of speed. The segment may extend over an arc representing say ± one-half knot of the selected speed. In the TRIM position 3 the maximum filter time constant given by C, $VR_3$ is less than the maximum given by C, $VR_2$ in the SPEED position 2 because it is often desirable to have a reasonably quick response to show how the boat reacts to small alterations in the trimming of it.

In position 4 of the switch the battery voltage is checked by connecting one side of the meter 131 to the negative line and the other side to the positive supply terminal through resistor $R_4$, the remainder of the circuit receiving no supply voltage.

The antiparallel connected diodes $D_1$ and $D_2$ provide protection for the meter 131 against excess voltage.

A list of component values for the circuit of FIG. 6 is given below, the values being given for a nominal 12-volt battery supply Transistors
$T_1$ - any suitable NPN type transistor
$T_2$ and $T_3$—2N4508
Resistors (all values given in kilohms)
$R_1$—2.2 : $R_2$—1.5 : $R_3$—47 : $R_4$—56 : $R_5$—8.2 : $R_6$—1.5 : $R_7$—47 :
$R_8$—22 : $VR_1$—2.5 : $VR_2$—100 : $VR_3$—25 : P—5 :
Meter 131 — 100 microamp. full scale deflection.
Diodes
$D_1$ and $D_2$—1N4148
ZD — stabilizing voltage = 5.6 volts In the circuit shown the transducer rheostat had a linear law but it will be appreciated that it is easy to manufacture or obtain rheostats having any desired law.

The transducer could alternatively be a variable capacitor with the movable vanes mechanically coupled to the shaft 24 or an inductive element with a movable core likewise coupled to shaft 24. In either case there would result a transducer having an electrical characteristic which varied with the angular position of shaft 24. However, a reactive device would need to be fed with an alternating current if the variation of its impedance was to be detected and while such an arrangement would present no difficulty to one in the art, it would not be as simple of a resistive element which, although useable in an alternating current arrangement, may be used, as hereinbefore described, in a relatively simple direct current circuit. As already mentioned, the use of direct current avoids the effects that the cable 37 might have on alternating current signals.

A log of distance covered can be obtained by the additional circuit units shown in block form in FIG. 6. The speed-representing voltage is taken from the wiper 96 and applied to a voltage-frequency converter 290 through linearizing circuitry if necessary. The output pulses from the converter 290 are applied to a counter 292. The count registered is therefore representative of the time-integral of the voltage applied to the converter. Readout of the count in desired form is provided by unit 294 which is driven through amplifier 296 (if required) from counter 292. The design and construction of these units are well known in the art. A preferred form of logging unit will be described briefly with reference to FIG. 7.

Figure 7:
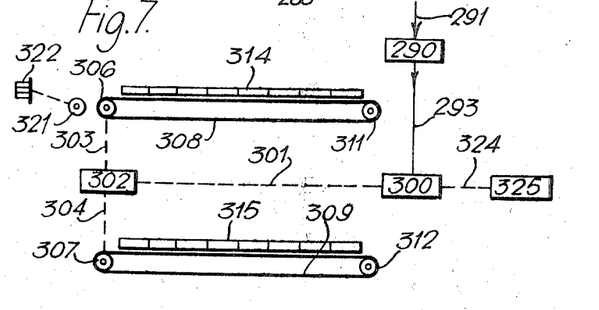
FIG. 7 shows in a diagrammatic form a logging unit for use with the circuit of FIG. 6.

It is intended that the arrangement shown in FIG. 7 could be made as a single unit connectable to the basic speed indicating unit of FIG. 6 to provide additional distance logging facilities.

The unit of FIG. 7 thus comprises the voltage/frequency converter 290 in input 291 of which is connected to receive the voltage at wiper 96 of the speed-indicating unit and the output 293 of which supplies a train of pulses at a repetition rate proportional to the input voltage.

The pulse output of the converter 290 is applied, through a power amplifier, if required, to an electromechanical actuator or stepper motor 300 which turns a predetermined angular amount for each pulse supplied thereto. The actuator 300 has an output shaft 301 coupled to a gear mechanism 302 having two output shafts 303 and 304. The shaft 303 is turned at the same rate as shaft 301 while shaft 304 is turned relative to shaft 300 at a reduction ratio of 10 : 1.

The shafts 303 and 304 carry drive wheels 306 and 307, respectively, of rubber or other friction materials fixedly mounted thereto. Around the drive wheels 306 and 307 pass endless flexible bands 308 and 309 respectively which are also supported by idler wheels 311 and 312 respectively. The bands are mounted to move along elongate windows in a face plate (not shown) of the logging unit.

Each band bears a marker, for example at the leading edge of a colored longitudinal portion of the band for easy viewing, which is read against a scale calibrated in distance at the adjacent edge of the window in the face plate. The scales are indicated by 314 and 315. Thus as the bands advance, the markers thereon traverse the windows. Preferably each long edge of a window is provided with a scale, the two scales being calibrated in sequence (e.g., 0–10 miles and 10–20 miles). The associated band is then provided with two markers at opposite edges such that as one marker reaches the end of the first scale and disappears from the window, the second marker appears at the other end of the window adjacent the second scale.

If the direct drive shaft 303 is associated with a 20 mile distance increment — to use the example given above, the reduced speed shaft 304 is associated with a 200 mile distance increment and the scales associated with band 315 are calibrated accordingly.

Alternatively the bands could be calibrated in distance and move past fixed markers on the face plate of the logging unit.

Each band is provided with a reset device comprising a friction wheel 321 operable by pushing in a knob 322 to engage the band whereupon by turning the knob the wheel 321 is turned to reset the band. Only the reset device for band 308 is shown in FIG. 7.

To provide a log of total distance covered, the actuator 300 is provided with further output shaft 324 driving a mechanical counter 325 which is displaced in another window of the face plate of the logging unit.

The mechanism herein described has been primarily directed to measuring the speed of a boat through water. The mechanism could be attached, however, to a pipe or channel to measure the rate of flow of fluid through the pipe or channel. In this case, integrating the rate of flow signal would give an indication of the volume of flow during the integration period.

What is claimed is:

1. A device for measuring the rate of flow of a fluid relative thereto, the device comprising a shaft mounted for rotation in a bearing;

an element for immersion in the fluid mounted at one end of said shaft for deflection together with said shaft about the axis of said shaft, by the force exerted on said element by the fluid flowing therepast;

means biasing said element against deflection such that said element adopts a position dependent on the rate of flow of said fluid, and an electrical transducer comprising a first, fixed part and a second part movable relative to said first part to provide an electrical characteristic which is a function of the relative position of said parts, said second part being coupled to the other end of said shaft to be movable therewith to provide said electrical characteristic as a function of the position of said element.

2. A device according to claim 1, wherein said transducer is a variable resistance device, said first part thereof comprising a resistive track portion and the second part comprising a wiper engaging said resistive track portion.

3. A device according to claim 2, comprising a housing in which said transducer is located, said housing being apertured and receiving said shaft through the aperture.

4. A device according to claim 3, wherein said bearing includes a sleeve mounted to said housing coaxially with said aperture therein, said shaft passing through the sleeve.

5. A device according to claim 4, wherein said element comprises a rod pivotally mounted to said shaft about an axis substantially perpendicular to the shaft axis and further comprising resilient means biasing said rod to project at right angles to the shaft axis.

6. A device according to claim 5, further comprising a tubular member to one end of which said sleeve is detachably secured with said shaft extending through said tubular member and the end of said shaft to which said element is mounted projecting from the other end of said tubular member, said tubular member including a chamber which tapers toward said one end of the tubular member and has openings at the narrower and wider ends thereof through which said shaft extends and a ball within said chamber and adapted, upon detachment of said sleeve and withdrawal of said shaft and element through said tubular member, to close the opening at the narrower end of said chamber to prevent the flow of fluid therethrough.

7. A device according to claim 1 further comprising a circuit arrangement connected to said transducer to energize same whereby said transducer provides a signal having a magnitude dependent on the relative position of the first and second parts thereof, said circuit arrangement including means responsive to the magnitude of said signal to provide a visual display of same.

8. A device according to claim 7, wherein said circuit arrangement comprises a transistor connected as a common-emitter amplifier and connected to receive said signal at the base of the transistor, means variable to provide a selectable voltage and a switch and wherein said display means is a meter connected between the collector of said transistor and said selectable voltage means through said switch in a first position thereof whereby the selectable voltage is applied as an offset voltage to said meter.

9. A device according to claim 7, further comprising a voltage-to-frequency converter responsive to the signal from said transducer and operable to provide a train of pulses having a repetition rate proportioned to the magnitude of said signal, and means responsive to said pulses to provide a display indicative of the time integral of said converter.

* * * * *